United States Patent [19]

Holbein et al.

[11] Patent Number: 4,596,409

[45] Date of Patent: Jun. 24, 1986

[54] IDENTIFICATION CARD AND METHOD OF PRODUCING IT

[75] Inventors: Hans J. Holbein; Thomas Maurer, both of Munich, Fed. Rep. of Germany

[73] Assignee: GAO Gesellschaft fuer Automation und Oganisation mbH, Fed. Rep. of Germany

[21] Appl. No.: 786,353

[22] Filed: Oct. 11, 1985

Related U.S. Application Data

[63] Continuation of Ser. No. 696,919, Jan. 31, 1985, abandoned, which is a continuation of Ser. No. 326,940, Dec. 3, 1981, abandoned.

[30] Foreign Application Priority Data

Dec. 23, 1980 [DE] Fed. Rep. of Germany ....... 3048736

[51] Int. Cl.⁴ .............................................. B42D 15/00
[52] U.S. Cl. ........................................ 283/75; 283/67; 283/77; 283/85; 283/93; 283/904; 346/76 L; 430/945; 430/947
[58] Field of Search ....................... 283/67, 70, 72, 74, 283/75, 77, 85, 86, 93, 107, 904; 346/76 L, 135.1; 430/945, 947

[56] References Cited

U.S. PATENT DOCUMENTS

| | | | |
|---|---|---|---|
| 3,715,734 | 2/1973 | Fajans | 346/76 L X |
| 3,899,333 | 8/1975 | Berman et al. | 430/947 X |
| 3,902,180 | 8/1975 | Sobajima et al. | 346/76 L X |
| 4,032,691 | 6/1977 | Kido et al. | 346/76 L X |

FOREIGN PATENT DOCUMENTS

| | | |
|---|---|---|
| 0031521 | 7/1981 | European Pat. Off. . |
| 0036680 | 9/1981 | European Pat. Off. ........... 430/945 |
| 2160732 | 8/1980 | Fed. Rep. of Germany . |
| 1360099 | 3/1964 | France . |
| 2131741 | 11/1972 | France . |
| 7503587 | 3/1976 | France ................................. 283/75 |
| 1045585 | 10/1966 | United Kingdom . |
| 1193511 | 6/1970 | United Kingdom . |
| 2044175 | 10/1980 | United Kingdom . |

Primary Examiner—Robert L. Spruill
Assistant Examiner—Taylor J. Ross
Attorney, Agent, or Firm—Robert J. Koch

[57] ABSTRACT

An identification card, in particular an all-plastic indentification card, written on by means of a laser, having user-related and user-neutral data such as a name, account number, etc. present on the surface of the indentification card in the form of local discolorations of the identification card material without any transition. Due to a local increase in tensile strength, these decolorized areas have greater resistance to mechanical changes and/or chemical solvents than the surrounding areas of the identification card made of the same identification card material. Thus attempted falsification by means of mechanical and chemical means is prevented in an especially effective way, since such attempts lead to destruction of the identification card in each case. The personalization of the identification card with the freely selectable user-related data can take place by preference decentrally by means of a laser beam, the energy of which is controlled in such a way that the identification card material is decolorized but not destroyed.

4 Claims, 2 Drawing Figures

IDENTIFICATION CARD AND METHOD OF PRODUCING IT

This application is a continuation of application Ser. No. 696,919, filed Jan. 31, 1985, now abandoned, which is in turn a continuation of application Ser. No. 326,940 filed on Dec. 3, 1981, now abandoned.

BACKGROUND OF THE INVENTION

The invention relates to an identification card, in particular an all-plastic identification card, having user-related and user-neutral data, in which the data are directly accesible on at least one of the card surfaces, as well as a method of producing such identification cards.

Identification cards in the form of credit cards, bank cards, cash payment cards and so on are employed increasingly in all kinds of service sectors, cashless payments and within enterprises. Due to their extensive use, they are typical mass production items, on the one hand, i.e. their production must be simple and economical; on the other hand, they must be designed in such a way that they are protected against forgery and falsification to as great a degree as possible. The many types of identification cards already on the market and still in a stage of development testify to the efforts of the relevant industry to optimize these two contradictory conditions.

In particular, it is necessary that the data related to the card owner, which are applied during the so-called personalization of the identification card, be protected in such a way that they cannot be manipulated afterwards. One possibility that has proved very useful in practice is the embedment of a paper inlay designed as a security print in a multilayer card. The paper inlay with its security features known in the production of security papers, such as watermarks, security threads, steel intaglio printing, etc., meets the highest standards of safety and is protected against all kinds of attempted forgery and falsification due to the protection of the data by a transparent cover film.

Mainly because of their much simpler and cheaper production, all-plastic identification cards are also used in the identification card sector, in which the identification card data and the general printed pattern are applied to the outer surface of a small plastic card, that may be multilayered, if desired. In various forms of execution the user-related data (name, account number, etc.) are impressed in this type of identification card through the back of the card so as to be in relief on the front. This allows for the transfer of the personalization data onto bills, etc. by means of an ink-ribbon in the various stores.

In spite of the economic advantages, these all-plastic identification cards have proved to be disadvantageous in that the directly accessible printed pattern and the personalization data are relatively unprotected against attempted falsification. The impressed data can be "ironed flat", for example, and then impressed over with other data.

The printed pattern is removed, if necessary, by means of chemical solvents available everywhere and then replaced or added to by another printed pattern.

In order to improve the legibility of the impressed data, the raised areas of the impressed writing are colored accordingly. The ink, however, is exposed to great stress in precisely this area, so that the legibility of the data varies considerably and changes constantly in the course of time. The use of this type of card in automatic, optical card-readers is therefore not possible. Due to the impossibility of providing photos inside the identification card, the universal use of this type of card is not possible either.

It must finally be mentioned that the identification cards are very unevenly stressed by the impressing process, which usually leads to a deformation of the body of the card. In addition to the resulting difficulties with respect to packaging, storage, etc., the use of these identification cards in general automatic identification card testing devices, e.g. for the reading of magnetic data, also involves difficulties.

Taking the security and production aspects into account, the German application No. 29 07 004 also disclosed an identification card having a card inlay made of paper and a transparent cover film, in which the person-related data are inscribed into the card inlay by means of a laser beam after the cover film has been laminated on. The necessary information can be burned into the inlay in this way, but it can also be present in the form of the discoloration of a thermosensitive coating applied to the inlay.

This type of card offers a high degree of protection against falsification and forgery, since the data are protected by the cover film against direct access.

As the burning in of the identification card data more or less destroys the structure of the material, these local areas are relatively susceptible to mechanical stress.

This is not detectable visually due to the cover film arranged on top of the data in the case of the known identification cards, and is not disturbing in any way due to the protection afforded by the cover film.

The discoloration present in a thermosensitive coating is relatively easy to remove or imitate when it is directly accessible, which makes the personalization of identification cards in the above-mentioned way appear rather unfeasible in the case of identification cards having data directly accessible on the outer surface.

The problem of the invention is therefore to provide an identification card which can be personalized in a final procedural step after its completion, in which the personalization data can be freely selected with respect to their form and design and can be provided so as to be directly accessible on the surface of the identification card and in which attempted falsification can be readily detected without auxiliary means.

SUMMARY OF THE INVENTION

This problem is solved according to the invention by providing the user-related data at least in the form of local discoloration of the identification card material without any transition on the surface of the identification card and it has been found, that the writing on a synthetic film by means of a laser beam recorder whose energy is carefully dosed can be made much more resistant to chemical and mechanical influences by means of local solidification processes, reduction and/or oxidation processes, the evaporation of plasticizers. During the writing process it must be taken care, to achieve the effect according to the invention, that the energy of the laser beam recorder is controlled in such a way that a discoloration of the identification card material occurs without any essential destruction of the latter. The laser energy necessary in each case must be worked out empirically on the various synthetic films. In addition to the direct control of the beam strength, one can also write with "impulse packages" of varying length.

PVC films dyed white with titanic oxide are particularly well suited for carrying out this type of "writing". The chemical processes that take place during the writing process according to the invention have not yet been explained sufficiently. It cannot be ruled out that during the carefully dosed effect of the laser beam a conversion process consisting of several individual processes takes place which causes the discoloration of the material. The titanic oxide used as a white pigment in the experimental films in question is reduced to a titanium appearing metallic grey or black. A corresponding conversion of the titanic oxide into titanium carbide, which is very resistant to chemical agents, is also considered possible.

This results in the advantage that precisely the areas of the identification card which are particularly in danger of being manipulated resist such attempts particularly well due to their above-mentioned high "resistence". Since the identification card data are provided on the outer surface of the identification card, they can practically only be changed by scratching each discolored area out of its surroundings, which leads to the destruction of the surface of the identification card in these areas.

It also proves very advantageous that not only photos, but also every kind of writing, pattern, etc. desired can be produced by means of the method according to the invention by merely changing the control software.

A further advantage must be recognized in the fact that in spite of its simple basic construction and economic production an extremely safe identification card is provided, since the appearance of the card is very decisively marked by the laser writing technique, the essential features thus obtained cannot be imitated by other techniques and the presence and intactness of these essential features can be checked without any auxiliary means. Since the technically very high quality laser recorders to be used for the personalization of the cards according to the invention are only available in very few places, a high degree of protection against falsification and total forgery is the result. Furthermore, these cards can be personalized decentrally and subsequent to the actual production of the identification cards, as can those mentioned in the German application No. 29 07 004.

It is also particularly advantageous that the proposals according to the invention allow for a very effective protection against falsification for all-plastic identification cards as well, since the identification card data are very effectively protected by the above-mentioned manner of being worked into the surface of the identification card and manipulation, damage or changes in this printed pattern are readily detectable.

BRIEF DESCRIPTION OF THE DRAWINGS

In the following, some embodiments of the invention are described by way of example on the basis of the adjoined drawings.

These show.

DETAILED DESCRIPTION OF THE PREFERRED EMBODIMENT

Figure 1:
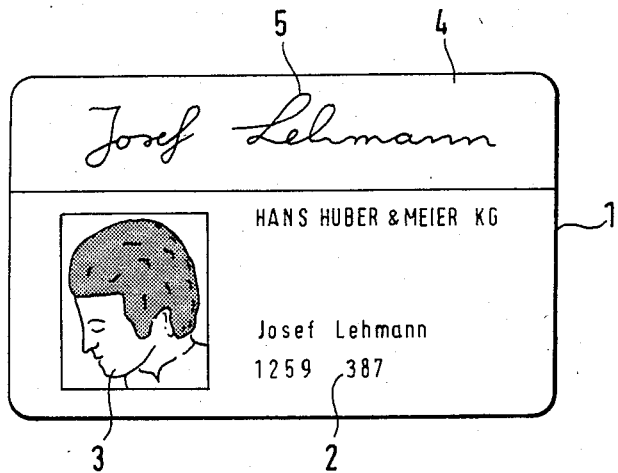
FIG. 1 an identification card according to the invention from the top.

FIG. 1 shows an all-plastic identification card 1 according to the invention with personalization data 2, a photo 3, a signature strip 4, which is provided with a signature 5 from the hand of the card owner. Both the personalization data 2 and the photo showing the card owner 3 are inscribed in the surface of the card by means of the laser writing technique according to the invention.

Figure 2:
FIG. 2 a schematic representation of an identification card according to the invention in cross-section.

As shown schematically in FIG. 2, the personalization data 2,3 are relatively deeply "burned into" the card surface. The "depth of burning in" depends on the available writing energy, the writing time and the identification card material used in each case, as mentioned above. It can vary from case to case and be adjusted within limits to various needs by changing the parameters mentioned.

The PVC card dyed with titanic oxide used in the case in question was heated where it was written on by means of a laser beam in such a way that a local discoloration of the film surface occurred, but the film was not destroyed. Since this also depends very essentially on the laser recorder used in each particular case in order to achieve this effect, precise directions for carrying out the writing process cannot be given. However, it is not particularly difficult for an expert familiar with laser technology as such and a laser recorder, to adjust the parameters necessary for the method according to the invention to the special case in question.

As the personalization data 2,3 are inscribed in the surface of the identification card without any transition by discoloration of the identification card material, the subsequent change of these data is practically only possible by scratching out each local area and thus only by destroying the surface of the identification card. Manipulation thus necessarily leads to the destruction of the surface of the identification card, even in the case of the embodiments shown in the figures, and can be recognized and checked by anyone without any auxiliary means.

What is claimed is:

1. A method of producing opaque all-plastic identification cards having a self supporting body with user-related and user-neutral data, the data being directly accessible on one of the card surfaces, comprising inscribing the user-related card, wherein said self supporting body is made from polyvinyl chloride dyed with titanium dioxide pigment, and controlling the energy of a laser beam in such a way as to produce a local discoloration of the identification card in an area of contact with the laser beam.

2. The method of claim 1 wherein said discoloration is brought about by oxidation and/or reduction of a portion of said self supporting body.

3. A hand-carried personal identification card comprising:
 a self-supporting opaque all plastic card body made from polyvinyl chloride dyed with titanium dioxide pigment, said card body having an information receiving surface;
 a first set of data being visually detectable and being applied using conventional printing techniques; and
 a second set of data being unique for each card and related to the authorized user of the card whereby said second set of data is burnt into the information receiving surface of said card by means of a laser beam whereby local irreversibly discolored zones, portions, or markings are produced which extend from the information receiving surface of the plastic material deeply into an inner area of the card body beyond the information receiving surface, and whereby the discolored surface portions and the surface portions not exposed to the laser beams form a smooth and flush surface.

4. The identification card of claim 3 comprising a single layer.

* * * * *